March 13, 1951 — L. McGIHON — 2,545,159
PROCESSING APPARATUS FOR FRUITS AND VEGETABLES
Filed July 9, 1946 — 2 Sheets-Sheet 1
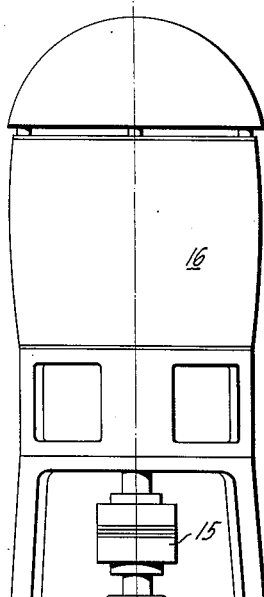
FIG_1_
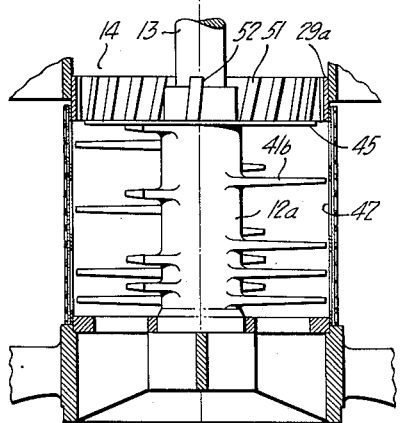
FIG_4_
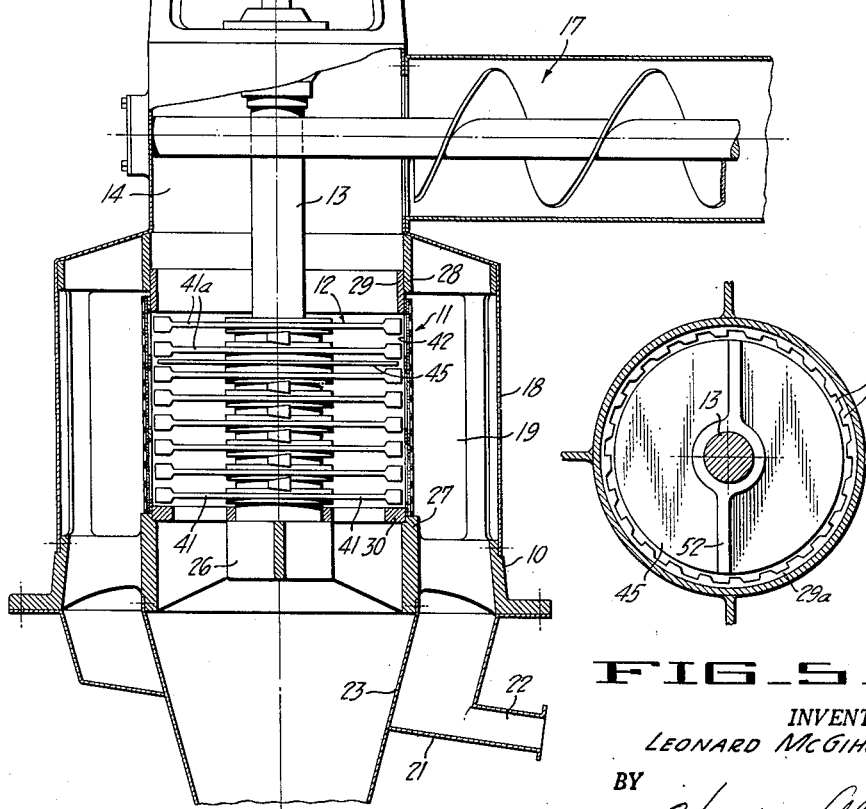
FIG_5_
INVENTOR.
LEONARD McGIHON
BY Harper Allen

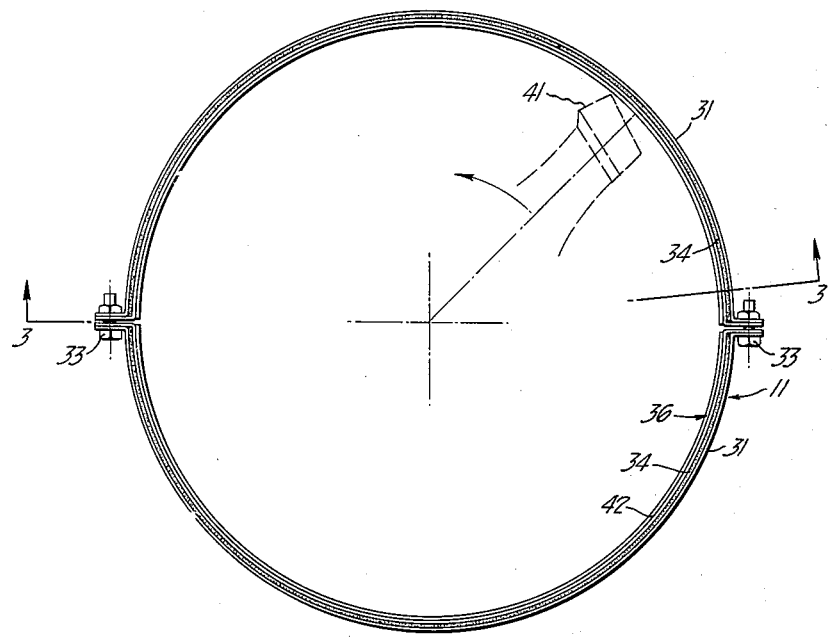
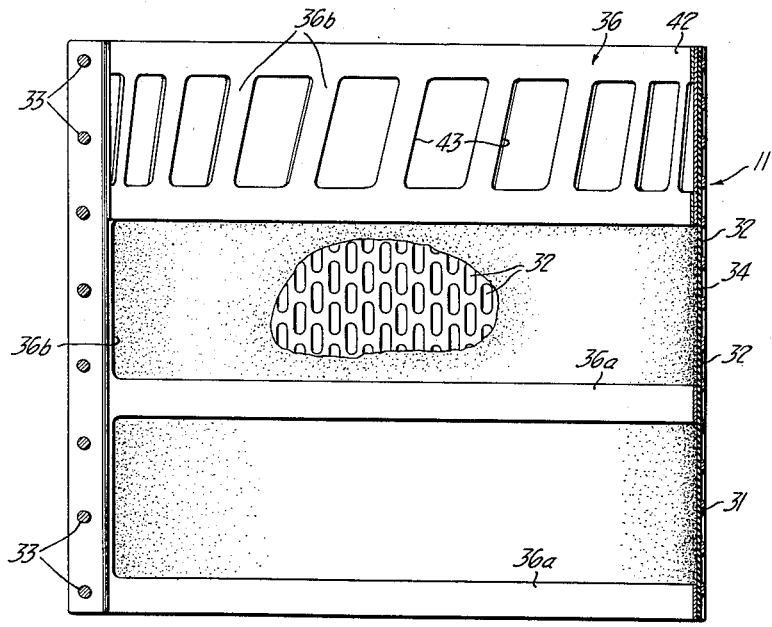

Patented Mar. 13, 1951

2,545,159

UNITED STATES PATENT OFFICE 2,545,159

PROCESSING APPARATUS FOR FRUITS AND VEGETABLES

Leonard McGihon, San Leandro, Calif., assignor to King Sales & Engineering Co., a corporation of California Application July 9, 1946, Serial No. 682,241

2 Claims. (Cl. 146—76)

This invention relates to the extraction or preparation of fruits and vegetable products such as juices and purees, and is concerned more particularly with the provision of fruit and vegetable products containing desired portions of comminuted or finely divided pulp.

It is a general object of the invention to provide improved methods and apparatus for extracting fruit and vegetable products containing juice and pulp.

Another object of the invention is to provide methods and apparatus of the above character which are adapted to work on the material in the raw state.

A further object of the invention is to provide methods and apparatus of the above character which produce a high percentage of extraction.

Still another object of the invention is to provide a simple inexpensive apparatus for extracting fruit and vegetable juices and purees.

Other objects and advantages of the invention will be apparent from the following description of certain preferred embodiments taken in conjunction with the accompanying drawings, in which:

Figure 1 is a side elevational view of an extractor, partially in section.

Figure 2 is a horizontal plan view of the screen assembly of the extractor.

Figure 3 is a sectional view of the screen assembly shown by the line 3—3 in Figure 2.

Figure 4 is a vertical sectional view of a modified form of extractor.

Figure 5 is a sectional plan view of the breaker and holding chamber of the extractor shown in Figure 4.

Referring to Figures 1, 2 and 3, the extractor comprises an upright main frame or casting 10 carrying a screen assembly 11 and a rotor 12 within the screen assembly. The upright drive shaft 13 for the rotor 12 extends upwardly through a material breaking and holding chamber 14 and is connected by a coupling 15 with a driving motor 16. A suitable form of screw feed mechanism 17 is adapted to feed material into the breaking and holding chamber 14. Around the screen assembly 11 there is provided a cover 18 which houses a sealed juice or puree outlet chamber 19 closed at the bottom by an inclined bottom wall 21 and having a discharge pipe 22 leading therefrom. At the lower end of the rotor 12 a discharge funnel 23 is provided for waste material.

As seen in Figure 1, the frame 10 provides at its lower portion a central boss 26 for journalling of the rotor shaft 13 and provides an annular boss or seat 27 for the lower end of the screen assembly 11. At the top the frame 10 is provided with an annular boss 28 within which an aligning and supporting ring 29 for the screen frame assembly 11 is suitably mounted.

Referring to Figures 2 and 3, the screen frame assembly 11 comprises a pair of semi-cylindrical outer screen frames or screen backing members 31 which are formed of sheet metal and provided with relatively large openings 32. The flanged edges of the screen frames are secured together by bolts 33. A screen section 34 is disposed within each screen frame member 31 and is held there by a semi-cylindrical retaining frame 36 having annular portions or ribs 36a joined by vertical connecting strips 36b, and these inner retaining members 36 are also provided with out-turned edges engaging and secured by the bolts 33. It will be noted that the construction of the screen retaining member 36 leaves the inner surface of the screen substantially completely exposed. The screen 34 may be formed of suitable material, such as bronze, stainless steel or an acid-resistant rubber, and is provided with perforations in the order of from 6400 to 430 per square inch so that sizes of the individual openings are in the order of from .004 inch to .023 inch.

The rotor 12 may comprise a counter-balanced array of hammer arms or blades 41 which have their outer ends bevelled on the trailing side, as shown in dotted lines in Figure 2. The leading edges of these arms 41 are spaced from the screen by an appropriate amount in the order of $1/8$ inch for an 18 inch inner diameter of the screen so that they impact the material and carry it past the screen without wiping it against the screen.

As seen in Figure 1, the two upper sets of hammers or arms 41a are spaced within the material holding and breaking chamber whose lower portion is located within a covered portion of the screen, i. e., within a double layer metal covering member 42 (Figure 3) formed in two semi-cylindrical sections and secured to the respective screen frames. The inner layer of the metal covering member is cut away at spaced intervals to provide for leading material downwardly as it is impacted and carried around by the two upper sets of arms 41.

To form the bottom of the breaking and holding chamber 14 for material, the rotor is provided with an annular disk or plate 45 which is disposed between the second and third highest of the sets of arms 41 and has its periphery spaced from the lower edge of the breaking and feeding member 42 to form a restricted annular feed opening leading from the breaking and holding chamber to the inlet end of the screen. Preferably the periphery of the plate 45 is spaced further from the inner surface of the adjacent assembly than the spacing of the arms 41 from the inner surfaces of the screen so that material is fed down into the path of the hammer arms at their outer ends. With the 1/8 inch spacing of the arms from the screen, a 3/8 inch opening between the plate 43 and the adjacent surface of the screen assembly 11 has been found satisfactory.

Referring to Figures 4 and 5, there is shown a modified form of the invention in which the breaking and holding chamber 14 is provided with comminuting means in the form of teeth 51 on the inner surface of the aligning and supporting ring 29a and a two-bladed rotor or breaking member 52 is mounted on the shaft 13 and disposed to wipe past the comminuting or breaking teeth 51. Preferably, both the teeth 51 and the blades of the breaking rotor 52 have a slight lead to assist in flow of material downwardly past the disk 45 to the annular treating space leading downwardly past the screen 42. In this instance the rotor 12a is provided with integrally formed hammer mill arms 41b. It will be understood, of course, that the forms of rotors 12 and 12a illustrated in the respective embodiments of the invention are interchangeable.

The operation of the above apparatus in carrying out the method of the invention will be described in connection with the production of apple juice containing pulp as prepared from fresh apples. Fresh whole apples (or halved apples) are fed by the feed mechanism 17 into the breaking and holding chamber 14 where the apples are broken up or comminuted by the action of the upper sets of arms 41a above the plate 45 until the particles of apple are all of the size to pass through the restricted opening about the plate 45. Preferably, the apples are fed in sufficient quantity to partially fill the breaking and holding chamber so that a continuous supply of comminuted or partially broken materias is available for downward feeding past the plate 43 to the hammer arms 41 and the screen 34. Thus an annular sheet or layer of comminuted material is fed to the screen and the hammer arms 41 which, with the dimension of the extractor previously referred to, are operated at 3,600 R. P. M. It will be noted that the space for feeding of material past the plate 43 is greater in radial extent than the spacing of the hammer arms 41 from the screen so that the material is fed initially into the path of the uppermost hammer arms for impact thereby. In this way a controlled hammer mill effect is provided in that only the outer ends of the hammer arms are used to impact the material and carry it around the screen. Preferably gravity is relied upon for feeding of material downwardly through the machine and the pattern of the material as it is fed downwardly is repeatedly disrupted by the hammer arms. Thus the hammer arms serve to divide the material finely by virtue of their impact thereon, and also to carry the material around the screen in a continuously rearranged fashion. In this way all of the particles of pulp and the juice have an opportunity to find their way through the opening in the screen. Juice and pulp particles determined by the size opening of the screen are fed outwardly through the screen while undesired portions of the fruit, such as the skin, core portions and seeds, are progressed downwardly past the screen supporting or holding ring 30 to the discharge tunnel 23. Preferably, the length of the screen is such that substantially all desired portions of the apples are passed through the screen during travel along the length thereof.

The unrestricted discharge opening for the portions of the fruit or vegetable too large to pass through the screen insures a continuous flow of the material through the extractor without trapping of material at any place along the screen. In this way there is no chance for material to collect along the screen and oxidize or otherwise deteriorate to affect the quality and flavor of the extracted portions of the material.

If desired, the chamber 19 into which the juice is introduced may be partially or wholly evacuated or filled with an inert gas to prevent oxidation of the material.

Subsequently, the apple juice containing pulp or other fruit or vegetable juices is deaerated, flash pasteurized and bottled or canned as desired.

If preferred, the preliminary breaking up or comminution of the material can be performed in conventional processing equipment, such as a grinder, comminutor, or pulper, and the material fed into the chamber 14 which would serve then only as a feed chamber and arms 41a (or 52) therein would not perform any breaking function. This type of arrangement would be employed in installations where a preliminary screening of the material might be desirable, as, for example, in removing the cores or hard centers of tomatoes.

While I have shown a preferred embodiment of the invention it will be understood that the invention is capable of variation and modification from the form shown so that its scope should be limited only by the scope of the claims appended hereto.

I claim:

1. Juice extracting apparatus comprising a cylindrical screen mounted with its axis upright and having its inner surface exposed, a rotor within the screen having hammer arms, a breaking and holding chamber above the screen, and means carried by said rotor adjacent the top of the screen and marginally spaced from the inner wall of said screen forming a bottom for the breaking and holding chamber and a restricted annular feed opening from the chamber to the screen with the opening partially overlying the ends of the hammer arms, said annular opening being of substantially uniform radial dimension to limit the size of particle to be admitted to the exposed screen.

2. Juice extracting apparatus comprising a cylindrical screen mounted with its axis upright and having its inner surface exposed, a rotor within the screen having hammer arms, a feed chamber above the screen, and means carried by said rotor adjacent the top of the screen and marginally spaced from the inner wall of said screen forming a bottom for the feed chamber and providing a restricted annular feed opening from the chamber to the screen with the opening partially overlying the ends of the hammer arms, said annular opening being of substantially uniform radial dimension to limit the size of particle to be admitted to the exposed screen.

LEONARD McGIHON.

REFERENCES CITED

The following references are of record in the file of this patent:

UNITED STATES PATENTS

| Number | Name | Date |
|---|---|---|
| 1,756,253 | Lykken | Apr. 29, 1930 |
| 2,223,739 | Newton | Dec. 3, 1940 |
| 2,240,213 | Fromm | Apr. 29, 1941 |
| 2,266,911 | Schwarz | Dec. 23, 1941 |
| 2,325,426 | Rietz | July 27, 1943 |
| 2,344,611 | Harris | Mar. 21, 1944 |